(12) United States Patent
Loh et al.

(10) Patent No.: US 9,087,157 B2
(45) Date of Patent: Jul. 21, 2015

(54) LOW-LOSS TRANSMISSION LINE TDM COMMUNICATION LINK AND SYSTEM

(75) Inventors: William Loh, Fremont, CA (US); Erik Vaclav Chmelar, Midland, MI (US)

(73) Assignees: William Loh, Fremont, CA (US); Erik Chmelar, Midland, MI (US)

( * ) Notice: Subject to any disclaimer, the term of this patent is extended or adjusted under 35 U.S.C. 154(b) by 0 days.

(21) Appl. No.: 13/405,335

(22) Filed: Feb. 26, 2012

(65) Prior Publication Data

US 2012/0224613 A1 Sep. 6, 2012

Related U.S. Application Data

(60) Provisional application No. 61/464,186, filed on Mar. 1, 2011.

(51) Int. Cl.
*H04B 1/38* (2015.01)
*G06F 13/38* (2006.01)

(52) U.S. Cl.
CPC ...................................... *G06F 13/38* (2013.01)

(58) Field of Classification Search
CPC ...................................................... G06F 13/38
USPC ................. 341/100–101; 710/26; 331/34, 57;
398/154, 139, 141, 25, 48, 59, 72;
375/219, 354; 714/801, 805, 807;
370/538, 535, 366, 389, 503, 518, 527,
370/528, 529

See application file for complete search history.

(56) References Cited

U.S. PATENT DOCUMENTS

| | | | | |
|---|---|---|---|---|
| 6,272,130 | B1 * | 8/2001 | Panahi et al. | 370/366 |
| 7,520,054 | B2 | 4/2009 | Pasternak et al. | |
| 7,860,398 | B2 * | 12/2010 | Tatum et al. | 398/141 |
| 8,464,145 | B2 * | 6/2013 | Grivna et al. | 714/801 |
| 8,538,259 | B2 * | 9/2013 | Kai | 398/48 |

* cited by examiner

*Primary Examiner* — Lam T Mai
(74) *Attorney, Agent, or Firm* — Erik Chmelar

(57) ABSTRACT

A time division multiplexing intra-chip communication system comprising at least one communication link. Such communication link comprises serialization and transmission circuitry, reception and deserialization circuitry, and at least one coaxial or wafer-level package transmission line interconnect therebetween. Such coaxial or wafer-level package transmission line interconnect may carry signals from such transmit circuitry to such receive circuitry. Such intra-chip communication links may achieve single-cycle operation or multi-cycle operation. Single single-cycle operation may be conducive to synchronous FSM design methodologies while multi-cycle operation may be conducive to data transfers to and from memory.

6 Claims, 6 Drawing Sheets

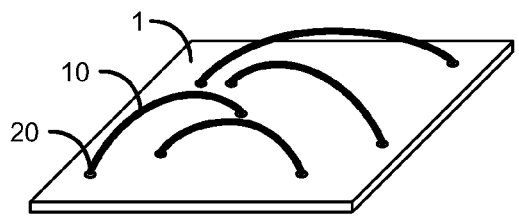
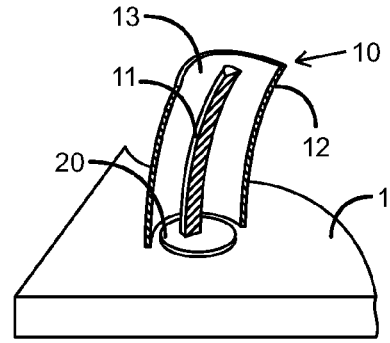
FIG. 1a        FIG. 1b
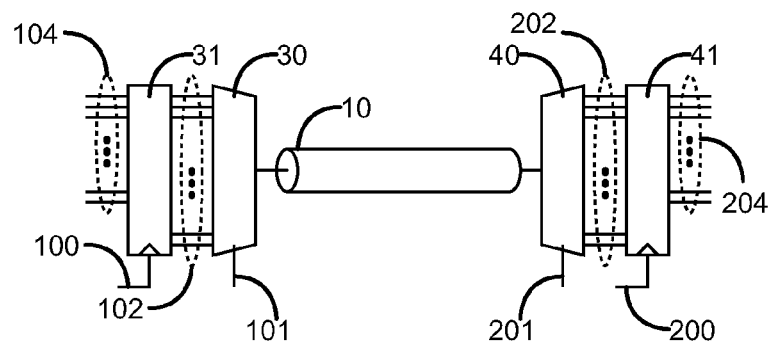
FIG. 2a
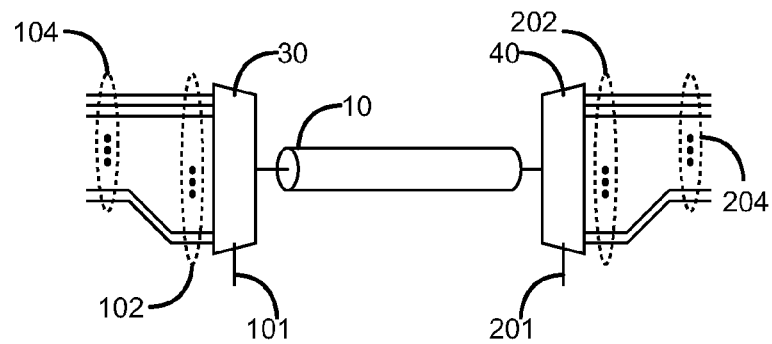
FIG. 2b

LOW-LOSS TRANSMISSION LINE TDM COMMUNICATION LINK AND SYSTEM

This application claims the benefit of U.S. provisional patent application No. 61/464,186, entitled "Intra-chip Micro-coaxial TDM Communication Link and System," filed Feb. 26, 2011 by applicant William Loh.

BACKGROUND OF THE INVENTION

The present invention relates generally to intra-chip high-speed serial communication for integrated circuit semiconductor devices. Specifically, the communication system may provide one or more of high-speed, high-bandwidth, low-power, and transparent intra-chip communication by utilizing Time Division Multiplexing (TDM) of signals over one or more of coaxial or Wafer Level Package (WLP) waveguides.

Serial links, so-called Serializer/Deserializers (SerDes), have already begun to replace parallel communication systems for inter-chip communications. Examples include Serial Advanced Technology Attachment (SATA) which replaces Parallel ATA (PATA), Peripheral Component Interconnect Express (PCI-e) which replaces parallel PCI (PCI-X), and Gigabit Ethernet (GbE) which replaces Fast Ethernet (100Base-T Ethernet).

There are several advantages of SerDes over parallel communication systems. SerDes utilize low-loss LC transmission lines that can yield a 10× improvement in signal rise times versus the RC interconnects utilized by parallel communication systems. SerDes is more power efficient than parallel communication systems for transmission of multi-gigabit-per-second (multi-Gbps) data signals over distances greater than several millimeters on chip at deep submicron process technology nodes. Finally, SerDes provides embedded clock information in the transmitted data stream, overcoming many of the clock skew and clock jitter limitations of multi-Gbps parallel communication systems.

Consequently, there has been much work to implement serial communication systems for intra-chip communication. These systems entail multiple SerDes communication links over standard on-chip metal-layer interconnect technology (for example Dally, "Interconnect-Centric Computing," 2007). However, on-chip metal layer interconnect technologies suffer from high line losses that must be compensated for or managed by the communication system, resulting in one or more of unfavorable power consumption, circuit complexity, circuit gate count, and circuit area. Other on-chip communication systems have implemented standard data communication over Wafer Level Package (WLP) interconnect technology, but have not utilized SerDes methodologies (for example Carchon, "Wafer-Level Packaging Technology for Extended Global Wiring and Inductors," 2003). WLP has similar line-loss impairments as on-chip interconnects, but to a lesser extent, due to the utilization of thicker conductor and insulator layers deposited on the wafer. The present invention implements an intra-chip communication system that shares the benefits of inter-chip SerDes systems by mitigating the drawbacks of WLP or metal-layer communication systems. Such intra-chip communication system utilizes a TDM scheduling methodology to serialize and transceive intra-chip digital data over coaxial interconnects. Such intra-chip communication system does not preclude the use of WLP interconnects; in fact, an alternate embodiment is to use WLP interconnects in place of, or along with, coaxial interconnects.

A coaxial interconnect is a transmission line comprising a central conductor surrounded by a conductive outer shield, with an insulator or gap disposed therebetween. Such total enclosure of the central conductor by the outer shield prevents electromagnetic fields from escaping the vicinity of the coaxial interconnect—similar to micro-strip, strip-line, or co-planar waveguide technologies—which results in lower crosstalk and more constant impedance. A commercially available coaxial interconnect technology is 'microCoax,' developed by Bridgewave Communications, Inc. of Santa Clara, Calif. (Pasternak, et. al. U.S. Pat. No. 7,520,054-B2). It has been designed and used for extremely high frequency inter-chip signal communication in the 30 to 300 GHz range, called Millimeter Wave (MMW) communication. An advantage of microCoax is that it is amenable to low-cost chip wire-bonding manufacturing techniques. microCoax, and other coaxial interconnect technologies, were neither explicitly designed for nor have been previously used for transceiving high-speed serial intra-chip signals, primarily due to the lack of a suitable, scalable, and practical intra-chip communication system, which the present invention addresses and solves.

It is well known that multi-Gbps single-system-clock-cycle (single-cycle) cross-chip communication—distances greater than a few millimeters—has become impossible. This necessitates multi-cycle Finite State Machine (FSM) design methodologies for digital logic or implementation of high-speed intra-chip communication systems capable of transceiving signals across chip within a single system clock cycle. Because multi-cycle FSMs are much more complicated than single-cycle FSMs to implement, verify, and test, and due to well established Electronic Computer-Aided Design (ECAD) models for single-cycle FSM design, single-cycle FSMs are preferred for digital logic.

Accordingly, what is desired, and has not heretofore been developed, is an intra-chip communication system that utilizes coaxial interconnects to achieve high-speed signal communication over distances greater than several millimeters. It is further desired that the intra-chip communication system be capable of transmitting and receiving such signals over such distances within a single system clock cycle, thereby being amenable to standard single-cycle FSM design methodologies. The intra-chip communication system utilizes TDM to aggregate multiple low-speed signals onto one or more high-speed coaxial interconnects using SerDes methodologies described in the following description of the invention.

BRIEF SUMMARY OF THE INVENTION

It is an object of the present invention to provide a high-speed serial intra-chip communication link with low-loss transmission lines.

It is an object of the present invention to provide an intra-chip serial communication link that may utilize at least one wire-bonded coaxial transmission line interconnect.

It is a further object of the present invention to provide an intra-chip serial communication link that may utilize at least one WLP transmission line interconnect.

It is an object of the present invention to provide an intra-chip serial communication link utilizing at least one coaxial transmission line interconnect that employs TDM.

It is a further object of the present invention to provide a low-power intra-chip communication link.

It is a further object of the present invention to provide an intra-chip serial communication link capable of achieving cross-chip signal transmission and reception within a single system clock cycle.

It is a further object of the present invention to provide an intra-chip serial communication link capable of achieving signal transmission and reception within multiple system clock cycles.

It is an object of the present invention to provide an intra-chip communication system comprising at least one intra-chip communication link.

BRIEF DESCRIPTION OF THE DRAWINGS

FIG. 1a is a perspective view of an exemplary chip showing several coaxial interconnects.

FIG. 1b is a cross-sectional view of a portion of a single coaxial interconnect adjoining a chip.

FIG. 2a is an exemplary circuit diagram of an intra-chip TDM communication link of the present invention in which circuit elements may process local signals prior to serialization and after deserialization.

FIG. 2b is an exemplary circuit diagram of an intra-chip TDM communication link of the present invention in which no circuit elements are present to process local signals prior to serialization and after deserialization.

FIG. 5b is an exemplary waveform diagram showing the TDM scheduling methodology of the single-cycle intra-chip TDM communication link of FIG. 5a.

DETAILED DESCRIPTION OF THE INVENTION

Figure 3:
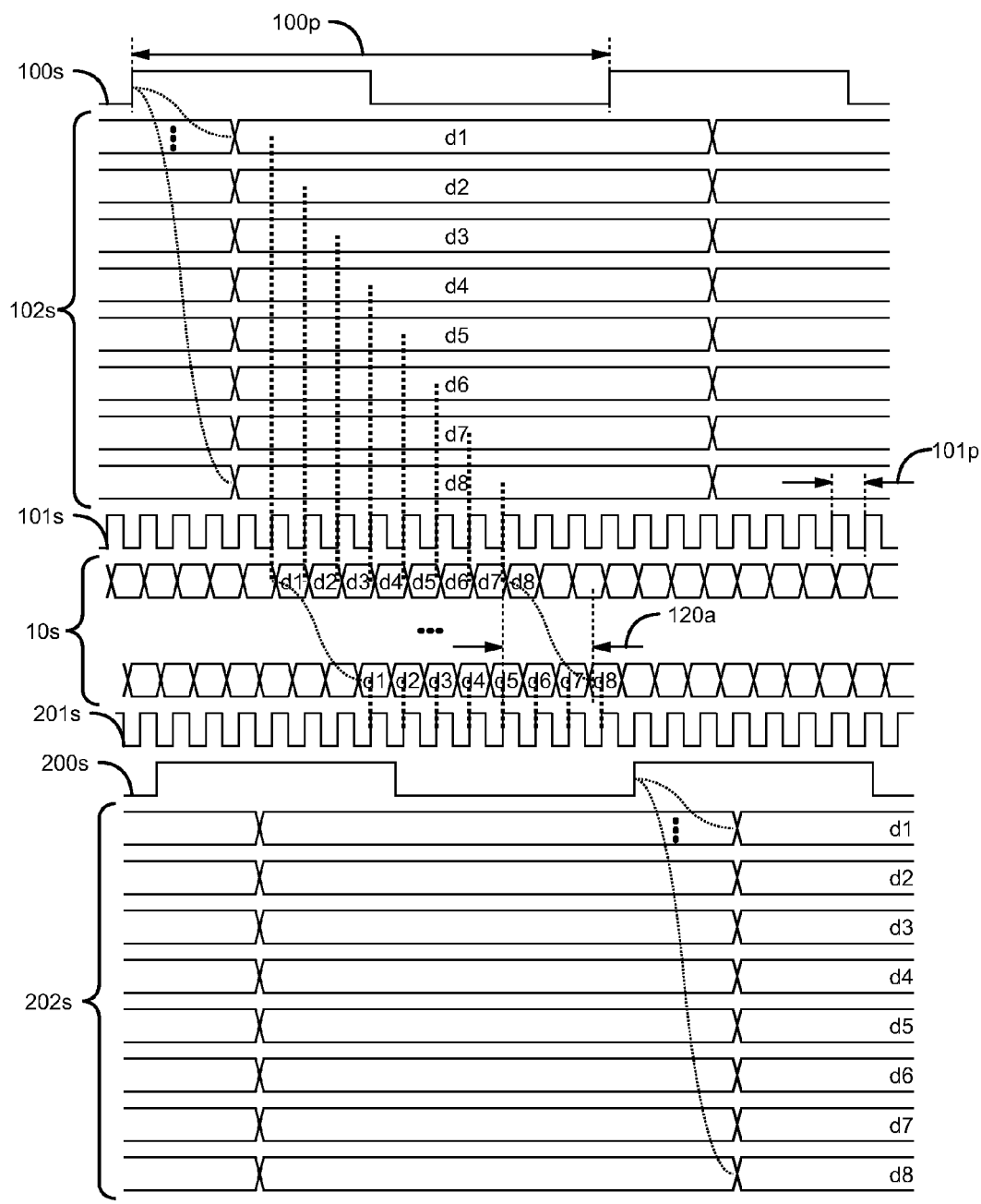
FIG. 3 is an exemplary waveform diagram of clock, parallel data, and serial data signals of the intra-chip TDM communication link of FIG. 2a or FIG. 2b in which single-cycle communication is achieved.

Heretofore and henceforth the term 'chip' is used to describe an integrated circuit device, including but not limited to a Field Programmable Gate Array (FPGA), Application Specific Integrated Circuit (ASIC), a single- or multi-core microprocessor, a Standard Product (SP), or an Application Specific Standard Product (ASSP), od a System-on-Chip (SoC).

Heretofore and henceforth the term 'micro-coax' is used to describe a transmission line comprising a central conductor surrounded by a conductive outer shield with an insulator or gap therebetween (a coaxial interconnect).

Heretofore and henceforth the terms 'circuit,', 'circuit element,' 'circuit block,' 'logic,' 'logic element,' 'logic block,' and 'logic cloud' may be used interchangeably.

Heretofore and henceforth the term 'amount of combinational logic' is used to describe any appropriate quantifiable parameter of a circuit including, but not limited to, number of logic gates, logic depth, or logic complexity; the terms 'small,' 'smaller,' 'large,' and 'larger' describe such relative amounts of combinational logic.

Heretofore and henceforth the term 'finite state machine' and its abbreviation 'FSM' are used to describe any synchronous digital circuit.

Heretofore and henceforth the terms 'digital data,' 'data stream,' 'digital signal,' 'signal,' 'bits,' and 'bit stream' may be used interchangeably.

Heretofore and henceforth the terms 'interconnect' and 'transmission line' may be used interchangeably.

Heretofore and henceforth the terms 'multiplexer' and 'mux' are used to describe any so-called serializer circuits known in the art that map m input signals to n≤m output signals; the terms 'demultiplexer' and 'demux' are used to describe any so-called deserializer circuits known in the art that map n input signals to m≥n output signals.

FIG. 1a shows an exemplary chip 1 with several low-loss transmission line interconnects 10, each end of which is wire-bonded thereto by means of a wire bond pad 20. Wire bonds and wire bonding technology is well know in the art and is therefore not discussed herein. FIG. 1b shows a cross-section view of a portion of a single low-loss transmission line interconnect 10. The low-loss transmission line interconnect 10 consists of a central conductor 11 surrounded by an insulator 13. The insulator 13 may be any suitable dielectric material, void, or air gap. Surrounding the insulator 13 is a conductive outer shield 12. Micro-coaxial interconnect technology is commercially available and is therefore not discussed herein.

FIG. 2a shows an exemplary circuit diagram of an intra-chip communication link utilizing a low-loss transmission line interconnect 10. The local data signal lines 104 may carry signals from some local region of a chip 1 to the transmit logic block 31. Also input to the transmit logic block 31 may be a transmit system clock line 100. Output from the transmit logic block 31 are parallel data signal lines 102. FIG. 3 shows exemplary signals for an exemplary 8-to-1 TDM communication link: transmit system clock signal 100s may be carried on transmit system clock line 100 and transmit parallel data signals 102s may be carried on parallel data signal lines 102. Although a positive edge-triggered synchronous design methodology is shown, any suitable methodology may be used, including but not limited to negative edge-triggered or level-sensitive.

The transmit logic block 31 may alternatively comprise combinational and sequential logic which may implement one or more synchronous FSMs. Otherwise the transmit logic block 31 may be absent, as shown by the alternate embodiment in FIG. 2b, in which local data signal lines 104 are connected directly to parallel data signal lines 102. Combinational and sequential logic of the transmit logic block 31, if present, may be re-ordered in transmit sequence and synchronized via the transmit system clock signal 100s.

Input to the multiplexer 30 are the parallel data signal lines 102 and transmit serial clock line 101. Output from the multiplexer 30 is the low-loss transmission line interconnect 10. The multiplexer 30 performs a parallel-to-serial conversion of transmit parallel data signals 102s carried on the parallel data signal lines 102, outputting the resulting high-speed serial data signal 10s to the low-loss transmission line interconnect 10. Serialization is accomplished by strobing the transmit parallel data signals 102s, shown as d1 through d8 in FIG. 3, at periodic intervals of the transmit serial clock signal 101s. Although an ordered round-robin selection methodology is shown, any suitable methodology may be used. There are many circuits that are known in the art that may be used in part or in full to implement the multiplexer 30, which are therefore not discussed herein.

The high-speed serial data signal 10s may be, but is not limited to, single-ended, differential, current-mode, voltage-mode, non-return-to-zero (NRZ), return-to-zero (RZ), duo-binary, Pulse Amplitude Modulated n (PAM-n), Manchester, differential Manchester, and so forth. Furthermore, although all exemplary circuit diagrams have been drawn with only one low-loss transmission line interconnect 10 between transmit and receive circuits of a single communication link, multiple low-loss transmission line interconnects 10 may be utilized for such single communication link. For example, two low-loss transmission line interconnects 10 may be used for differential signaling of high-speed serial data signal 10s, which is within the scope of the present invention. Similarly, a single low-loss transmission line interconnect 10 may be used for single-ended signaling of high-speed serial data signal.

The transmit serial clock period 101p may be some suitable fraction of the transmit system clock period 100p. This is the fastest clock in the system. The serialization factor—the number of parallel signals that may be serialized by the multiplexer 30 per unit time interval—may be a function of the ratio of the transmit system clock period 100p to the transmit serial clock period 101p. Exemplary FIG. 3 shows an 8-to-1 serialization factor.

As shown in FIG. 3, there may be a data transport delay 120a of the high-speed serial data signal 10s from the time is was transmitted by the multiplexer 30 to the time it is received by the demultiplexer 40. Input to the demultiplexer 40 are the low-loss transmission line interconnect 10 and receive serial clock line 201. Output from the demultiplexer 40 are parallel data signal lines 202. The demultiplexer 40 performs a serial-to-parallel conversion of the high-speed serial data signal 10s, outputting the resulting receive parallel data signals 202s to parallel data signal lines 202. Deserialization is accomplished by strobing the high-speed serial data signal 10s, shown as d1 through d8 in FIG. 3, at periodic intervals of the receive serial clock signal 201s. There are many circuits that are known in the art that may be used in part or in full to implement the demultiplexer 40, which are therefore not discussed herein.

Input to the receive logic block 41 are the parallel data signal lines 202. Also input to the receive logic block 41 may be a receive system clock line 200. Output from the receive logic block 41 are local data signal lines 204. FIG. 3 shows exemplary signals: receive system clock signal 200s may be carried on receive system clock line 200 and receive parallel data signals 202s may be carried on parallel data signal lines 202. The local data signal lines 204 may carry signals from the receive logic block 41 to some local region of the chip 1.

The receive logic block 41 may alternatively comprise combinational and sequential logic which may implement one or more synchronous FSMs. Otherwise the receive logic block 41 may be absent, as shown by the alternate embodiment in FIG. 2b, in which parallel data signal lines 202 are connected directly to local data signal lines 204. Combinational and sequential logic of the receive logic block 41, if present, may be synchronized and/or re-ordered in the transmit sequence via the receive system clock signal 200s.

The TDM communication system of the present invention may operate plesiochronously or mesochronously; there need not be any clock tree that distributes system clock signals or serial clock signals between transmit and receive circuits. The transmit system clock signal 100s corresponds to the system clock signal of the local clock domain of the transmit end of the TDM communication link; the receive system clock signal 200s corresponds to the system clock signal of the local clock domain of the receive end of the TDM communication link. The transmit serial clock signal 101s may be derived from the transmit system clock signal 100s. The receive serial clock signal 201s may be recovered from the high-speed serial data signal 10s using any suitable clock recovery methodology, including but not limited to bang-bang or Mueller-Müller, which are well known in the art and are therefore not discussed herein. Such clock recovery circuitry may be a functional portion of the demultiplexer 40. Finally, the receive system clock signal 200s may be derived from the receive serial clock signal 201s. Clock signal derivation may be accomplished by any suitable means, including but not limited to Phase-Locked Loops (PLLs) and Delay-Locked Loops (DLLs), which are well known in the art and are therefore not discussed herein.

Figure 5A:
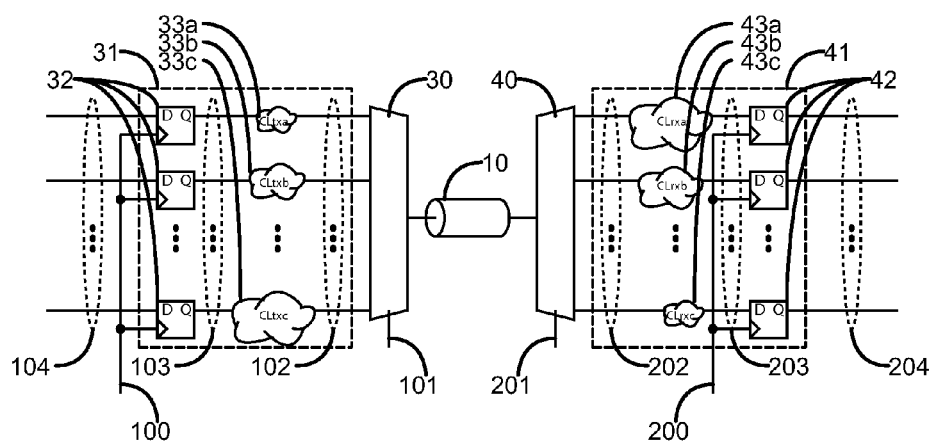
FIG. 5a is an exemplary circuit diagram of an intra-chip TDM communication link implementing single-cycle operation via combinational logic partitioning.
Figure 5B:
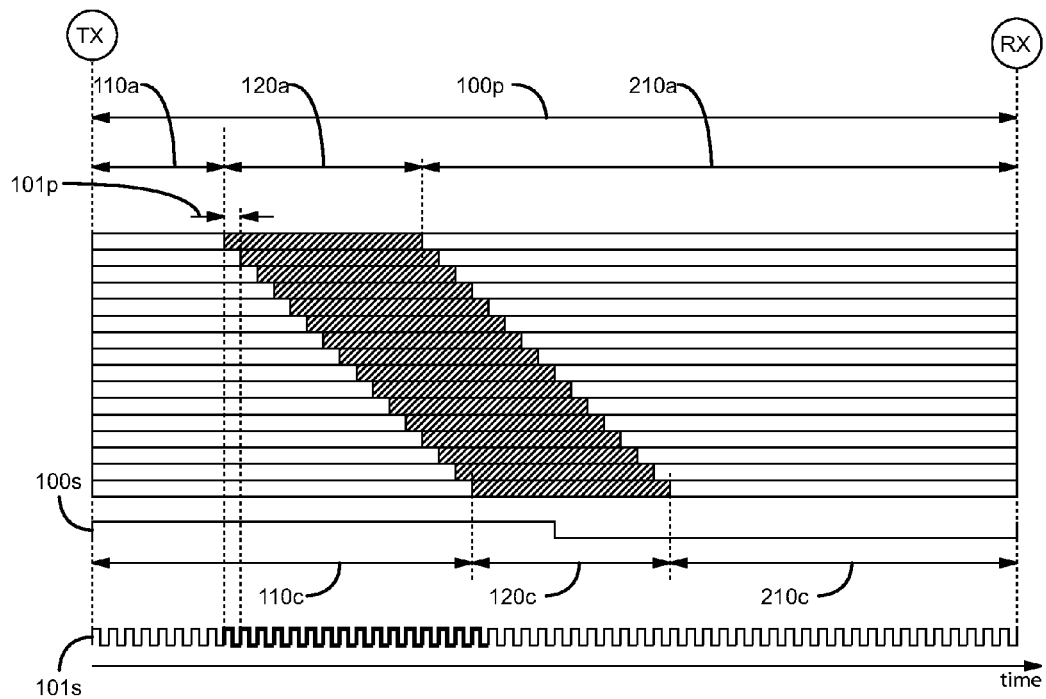

The exemplary intra-chip TDM communication systems shown in FIG. 2a and FIG. 2b, described by FIG. 3, and shown in FIG. 5a and described by FIG. 5b, achieve single-cycle operation: transmit parallel data signals 102s are serialized and transmitted by the multiplexer 30 as high-speed serial data signal 10s, carried across low-loss transmission line interconnect 10, and received and deserialized into receive parallel data signals 202s by the demultiplexer 40, all within one transmit system clock period 100p. Consequently, such single-cycle operation may be entirely transparent to single-cycle FSM design methodologies, providing a great advantage for design, implementation, and test of FSMs versus multi-cycle FSM design methodologies.

Figure 4A:
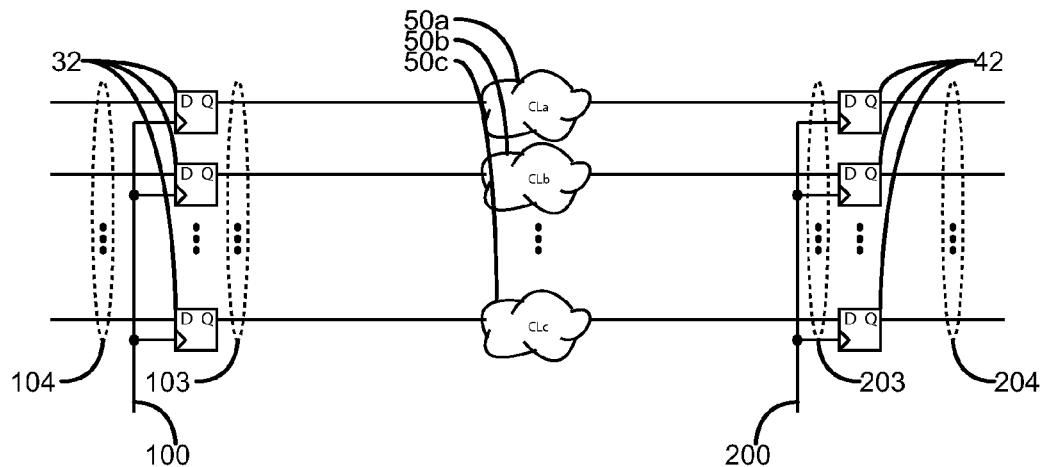
FIG. 4a is an exemplary prior art FSM circuit diagram.
Figure 4B:
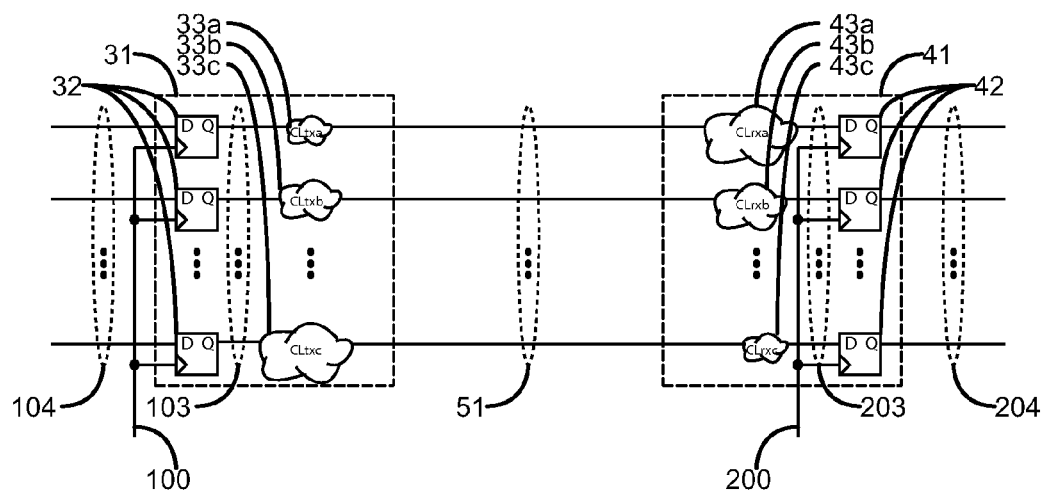
FIG. 4b is an exemplary FSM circuit diagram with combinational logic partitioned.

FIG. 4a shows an exemplary circuit diagram of a typical prior art single-cycle FSM; between transmit bistables 32 and receive bistables 42 may be combinational logic, depicted as combinational logic 50a, combinational logic 50b, and combinational logic 50c. FIG. 4a, FIG. 4b, and FIG. 5a are drawn without fan-in or fan-out nets to or from the combinational logic clouds for simplicity only; in general, and within the scope of the present invention, there may exist fan-in or fan-out nets between transmit bistables 32 and receive bistables 42. Such single-cycle FSM may be transformed into the circuit diagram shown in FIG. 4b. The combinational logic 50a is partitioned into transmit combinational logic 33a and receive combinational logic 43a, combinational logic 50b is partitioned into transmit combinational logic 33b and receive combinational logic 43b, and combinational logic 50c is partitioned into transmit combinational logic 33c and receive combinational logic 43c. The size of the logic clouds drawn in FIG. 4b depicts the relative amount of combinational logic individually contained therein. The parallel interconnects 51 join such pairs of combinational logic clouds.

FIG. 5a shows the exemplary circuit diagram of FIG. 4b with the parallel interconnects 51 replaced by parallel data signal lines 103, multiplexer 30, low-loss transmission line interconnect 10, parallel data signal lines 203, and demultiplexer 40 in accordance with the present invention. FIG. 5b shows a corresponding exemplary time-space diagram in which an ordered round-robin TDM selection methodology is used to serialize and transmit data across the low-loss transmission line interconnect 10. The data associated with transmit combinational logic 33a is the first to be selected and transmitted; the data associated with transmit combinational logic 33c is the last to be selected and transmitted. Given m data units to be serialized and transmitted, the first data is selected at least m transmit serial clock periods 101p earlier than the last data (a data unit may be a bit, byte, or any convenient quantifiable unit). Thus, by partitioning combinational logic 50a into small transmit combinational logic 33a, which has correspondingly small transmit logic delay 110a, and large receive combinational logic 43a, which has correspondingly large receive logic delay 210a, the entire functionality of such original combinational logic 50*a* is preserved for such first data within one transmit system clock period 100*p*. Similarly, by partitioning combinational logic 50*c* into large transmit combinational logic 33*c*, which has correspondingly large transmit logic delay 110*c*, and small receive combinational logic 43*c*, which has correspondingly small receive logic delay 210*c*, the entire functionality of the original combinational logic 50*c* is preserved for such last data within one transmit system clock period 100*p*. All other combinational logic clouds, for example combinational logic 50*b*, are similarly partitioned according to such ordered round-robin selection schedule, for example into transmit combinational logic 33*b* and receive combinational logic 43*b*, to preserve the entire functionality of such original combinational logic cloud. Such TDM scheduling permits single-cycle and transparent FSM design methodologies.

The logic delays shown in FIG. 5*b* are maximum delays; the actual delay must be less than or equal to those shown. Furthermore, such logic delays may include delays associated with sequential circuit elements including but not limited to setup time and hold time.

Single-cycle operation may not always be desired. For example, it may be advantageous to utilize multiple system clock cycles to transfer large amounts of data to or from memory. The exemplary intra-chip TDM communication system shown in FIG. 6*a* and described by FIG. 7 achieves multi-cycle operation: transmit parallel data signals 102*s* are serialized and transmitted by the multiplexer 30 as high-speed serial data signal 10*s*, carried by the low-loss transmission line interconnect 10, and received and deserialized into receive parallel data signals 202*s* by the demultiplexer 40, over the duration of multiple transmit system clock periods 100*p*.

Figure 6A:
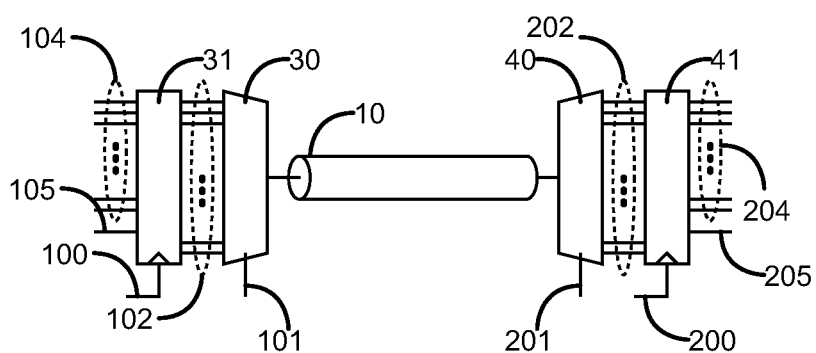
FIG. 6a is an exemplary circuit diagram of an intra-chip TDM communication link of the present invention in which circuit elements may process local signals prior to serialization and after deserialization.
Figure 7:
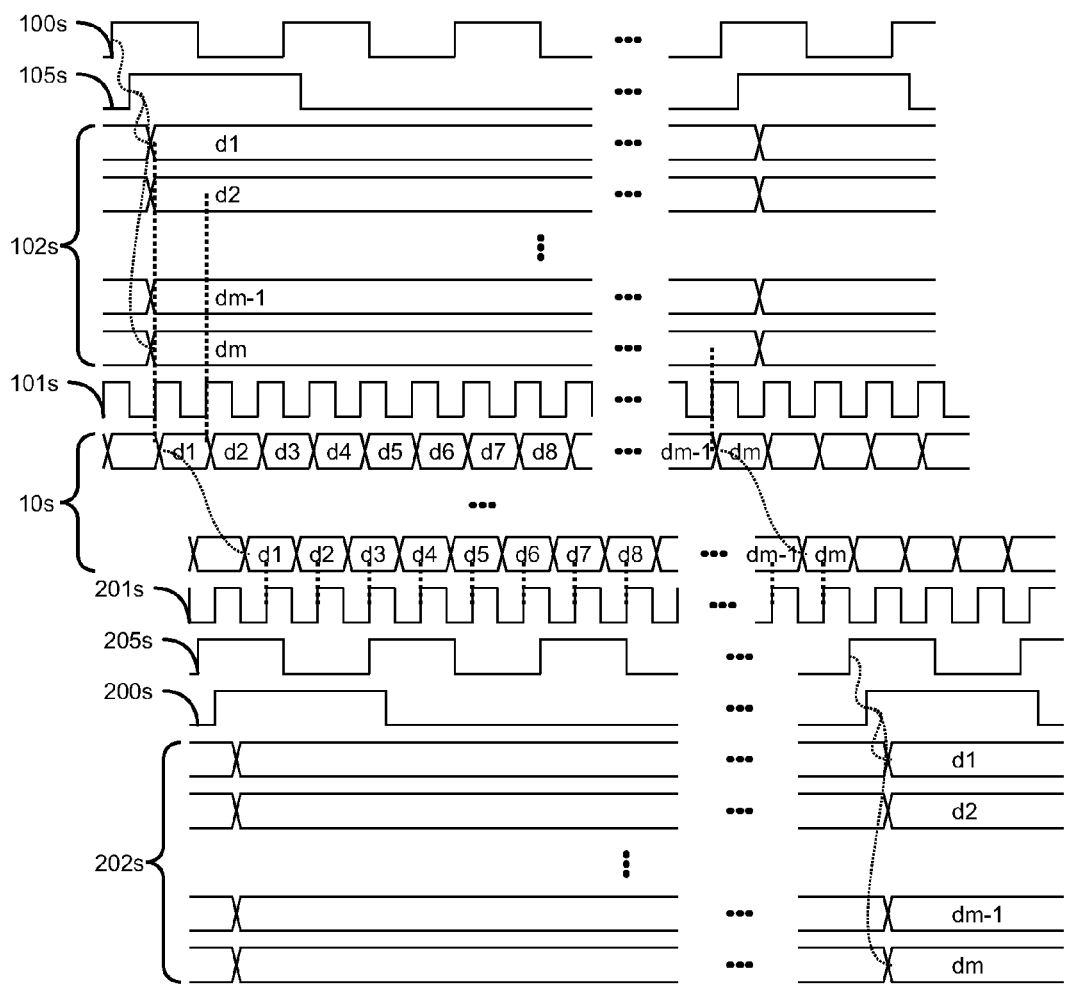
FIG. 7 is an exemplary waveform diagram of clock, parallel data, and serial data signals of the intra-chip TDM communication link of FIG. 6a in which multi-cycle communication is achieved.

FIG. 6*a* shows a transmit control signal line 105 that may be input to the transmit logic block 31, which may carry a transmit control signal 105*s*. Alternatively, such transmit control signal 105*s* may be generated within the transmit logic block 31 via combinational and sequential logic that may be present therein. The transmit control signal 105*s* may control, re-sequence, or synchronize m transmit parallel data signals 102*s*, shown as d1 through dm in FIG. 7, such transmit parallel data signals 102*s* originating or transformed from some local region of a chip 1. Such m transmit parallel data signals 102*s* are serialized and transmitted by the multiplexer 30, and received and deserialized by the demultiplexer 40, as previously described.

Figure 6B:
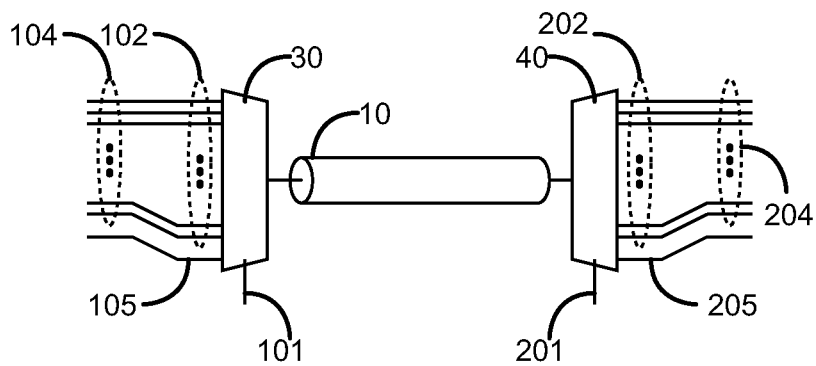
FIG. 6b is an exemplary circuit diagram of an intra-chip TDM communication link of the present invention in which no circuit elements are present to process local signals prior to serialization and after deserialization.

Input to the receive logic block 41 may be a receive control signal line 105, which may carry a receive control signal 105*s*. Alternatively, such receive control signal 105*s* may be generated within the receive logic block 41 via combinational and sequential logic that may be present therein. The receive control signal 105*s* may control or synchronize m receive parallel data signals 202*s*, such receive parallel data signals 202*s* may be alternatively transformed and subsequently distributed to some local region of the chip 1. The transmit logic block 31 and receive logic block 41 may alternatively comprise additional combinational and sequential logic which may implement one or more synchronous FSMs. FIG. 6*b* shows an alternate embodiment of FIG. 6*a* in which no transmit logic block 31 and no receive logic block 41 are present.

One specific embodiment of the intra-chip communication system is the microCoax; many variations or modifications would be apparent that do not depart from the spirit and scope of the invention. For example, an alternate intra-chip communication link embodiment may utilize WLP interconnects in place of micro-coax interconnects throughout. Furthermore, a first alternate intra-chip communication system may utilize WLP communication links throughout; a second alternate intra-chip communication system may utilize both micro-coax and WLP communication links. Still further, carbon nanotubes and superconducting interconnects may be utilized in place of or in combination with micro-coax interconnects. Such deviations from the exemplary descriptions and illustrations provided are within the scope of the present invention, which is defined by the appended claims.

What is claimed is:

1. An intra-chip communication link comprising:
   a transmit circuit operative to serialize a plurality of parallel inputs into at least one serial output,
   a receive circuit operative to deserialize at least one serial input into a plurality of parallel outputs,
   at least one first wire bond pad conductively coupled to said serial output,
   at least one second wire bond pad conductively coupled to said serial input, and
   at least one coaxial interconnect comprising a central conductor surrounded by a conductive outer shield and an insulator disposed therebetween,
   wherein a first end of said central conductor is conductively coupled to said first wire bond pad and a second end of said central conductor is conductively coupled to said second wire bond pad.

2. The intra-chip communication link of claim 1 further comprising:
   for at least one of each said plurality of parallel inputs a first circuit operatively coupled thereto, said first circuit comprising combinational and sequential elements, said sequential elements responding to assertion of a first system clock signal,
   a first serial clock signal, each assertion of said first serial clock signal operative to conductively couple one of said plurality of parallel inputs to said serial output,
   a second serial clock signal, each assertion of said second serial clock signal operative to conductively couple said serial input to at least one of said plurality of parallel outputs, and
   for at least one of each said plurality of parallel outputs a second circuit operatively coupled thereto, said second circuit comprising combinational and sequential elements, said sequential elements responding to assertion of a second system clock signal,
   wherein the propagation delay of said circuit elements of said first circuit is directly proportional to the duration of time between the assertion of said first system clock signal and the assertion of said first serial clock signal that conductively couples said parallel input to said serial output, and
   wherein the propagation delay of said circuit elements of said second circuit is directly proportional to the duration of time between the assertion of said second serial clock signal that conductively couples said serial input to said parallel output and the assertion of said second system clock signal.

3. An intra-chip communication link comprising:
   a transmit circuit operative to serialize a plurality of parallel inputs into at least one serial output,
   a receive circuit operative to deserialize at least one serial input into a plurality of parallel outputs,
   at least one first wire bond pad conductively coupled to said serial output,
   at least one second wire bond pad conductively coupled to said serial input, and
   at least one wafer-level package interconnect, wherein a first end of said wafer-level package interconnect is conductively coupled to said first wire bond pad and a second end of said wafer-level package interconnect is conductively coupled to said second wire bond pad.

4. The intra-chip communication link of claim 3 further comprising:
for at least one of each said plurality of parallel inputs a first circuit operatively coupled thereto, said first circuit comprising combinational and sequential elements, said sequential elements responding to assertion of a first system clock signal,
a first serial clock signal, each assertion of said first serial clock signal operative to conductively couple one of said plurality of parallel inputs to said serial output,
a second serial clock signal, each assertion of said second serial clock signal operative to conductively couple said serial input to at least one of said plurality of parallel outputs, and
for at least one of each said plurality of parallel outputs a second circuit operatively coupled thereto, said second circuit comprising combinational and sequential elements, said sequential elements responding to assertion of a second system clock signal,
wherein the propagation delay of said circuit elements of said first circuit is directly proportional to the duration of time between the assertion of said first system clock signal and the assertion of said first serial clock signal that conductively couples said parallel input to said serial output, and
wherein the propagation delay of said circuit elements of said second circuit is directly proportional to the duration of time between the assertion of said second serial clock signal that conductively couples said serial input to said parallel output and the assertion of said second system clock signal.

5. An intra-chip communication link comprising:
a transmit circuit operative to serialize a plurality of parallel inputs into at least one serial output,
a receive circuit operative to deserialize at least one serial input into a plurality of parallel outputs,
at least one first wire bond pad conductively coupled to said serial output,
at least one second wire bond pad conductively coupled to said serial input, and
at least one coaxial interconnect comprising a central conductor surrounded by a conductive outer shield and an insulator disposed therebetween,
wherein a first end of said central conductor is conductively coupled to said first wire bond pad and a second end of said central conductor is conductively coupled to said second wire bond pad,
said intra-chip communication link further comprising:
for at least one of each said plurality of parallel inputs, a first circuit operatively coupled thereto, said first circuit comprising combinational and sequential elements, said sequential elements responding to assertion of a first system clock signal,
a first serial clock signal, each assertion of said first serial clock signal operative to conductively couple one of said plurality of parallel inputs to said serial output,
a second serial clock signal, each assertion of said second serial clock signal operative to conductively couple said serial input to at least one of said plurality of parallel outputs, and for at least one of each said plurality of parallel outputs, a second circuit operatively coupled thereto, said second circuit comprising combinational and sequential elements, said sequential elements responding to assertion of a second system clock signal,
wherein the propagation delay of said circuit elements of said first circuit is directly proportional to the duration of time between the assertion of said first system clock signal and the assertion of said first serial clock signal that conductively couples said parallel input to said serial output, and
wherein the propagation delay of said circuit elements of said second circuit is directly proportional to the duration of time between the assertion of said second serial clock signal that conductively couples said serial input to said parallel output and the assertion of said second system clock signal.

6. An intra-chip communication link comprising:
a transmit circuit operative to serialize a plurality of parallel inputs into at least one serial output,
a receive circuit operative to deserialize at least one serial input into a plurality of parallel outputs,
at least one first wire bond pad conductively coupled to said serial output,
at least one second wire bond pad conductively coupled to said serial input, and
at least one wafer-level package interconnect,
wherein a first end of said wafer-level package interconnect is conductively coupled to said first wire bond pad and a second end of said wafer-level package interconnect is conductively coupled to said second wire bond pad,
said intra-chip communication link further comprising:
for at least one of each said plurality of parallel inputs, a first circuit operatively coupled thereto, said first circuit comprising combinational and sequential elements, said sequential elements responding to assertion of a first system clock signal,
a first serial clock signal, each assertion of said first serial clock signal operative to conductively couple one of said plurality of parallel inputs to said serial output,
a second serial clock signal, each assertion of said second serial clock signal operative to conductively couple said serial input to at least one of said plurality of parallel outputs, and
for at least one of each said plurality of parallel outputs, a second circuit operatively coupled thereto, said second circuit comprising combinational and sequential elements, said sequential elements responding to assertion of a second system clock signal,
wherein the propagation delay of said circuit elements of said first circuit is directly proportional to the duration of time between the assertion of said first system clock signal and the assertion of said first serial clock signal that conductively couples said parallel input to said serial output, and
wherein the propagation delay of said circuit elements of said second circuit is directly proportional to the duration of time between the assertion of said second serial clock signal that conductively couples said serial input to said parallel output and the assertion of said second system clock signal.

* * * * *